Dec. 5, 1967 J. RABINOW 3,356,372

FREE-TRACKING PHONOGRAPH PICKUP

Filed Dec. 9, 1964 2 Sheets-Sheet 1

INVENTOR

Jacob Rabinow

BY Max L. Libman

ATTORNEY

INVENTOR
Jacob Rabinow

BY Max L. Libman
ATTORNEY 3,356,372
FREE-TRACKING PHONOGRAPH PICKUP
Jacob Rabinow, 6920 Selkirk Drive,
Bethesda, Md. 20034
Filed Dec. 9, 1964, Ser. No. 417,178
2 Claims. (Cl. 274—23)

ABSTRACT OF THE DISCLOSURE

A very small, lightweight phonograph pickup having low-friction means for moving the stylus in a radial line as a disk record is placed, said head being so small as to lie completely within and above the turntable periphery, being pivotally movable at the stylus and toward and away from a record being played, the pivotal axis of such movement being very close to the record playing surface to substantially eliminate excursions of the stylus along the record groove.

This invention relates to means for supporting phonograph pickups and particularly to means for guiding phonographs pickups to move across the record in a straight line so that the pickup is always tangent to the record groove when playing conventional flat disc records.

It is well known that records are cut on lathes so that the cutter moves in a straight line radially with respect to the record. If the playback mechanism is not tangent to the record, serious distortions are introduced and various means are employed to achieve tangency or approximate tangency between the groove of the record and the center line of the pickup. The most common technique used today is the offset arm in which the pickup is supported by a bent arm and so mounted that the pickup describes an arc across the record and maintains reasonably good tangency to the groove over the range of the radii covered in modern recordings. The offset arm, however, suffers in several respects. One is that the tangency is only an approximation, and two, that undesirable side pressures are produced on the stylus so that while the pickup body may be tangent, the stylus itself is pushed out of tangency and the unbalanced forces on the stylus and its supporting mechanism create displacement and distortions which are quite serious.

Straight line motions of the pickup which assure tangency have been the goal of designers from the beginning of the recording art. For example, one can cite the following devices which permit the pickup to move in a straight line supported by a rolling carriage: Morton, No. 948,-959; Bard, No. 2,869,877; and De Weese, No. 2,532,293. Another approach is shown in my Patent No. 2,915,315, where the pickup is mounted on a fairly conventional arm except that the arm itself is mounted on a moving carriage which is servoed to the tangency angle in such a way that the carriage moves to maintain the pickup tangent to the groove. While the servo arm has proved entirely satisfactory in actual practice, it is a fairly elaborate and expensive device and does not eliminate the additional mass which consists of a portion of the arm, and which is added to the pickup. In modern pickups the compliance of the stylus is very high, that is, the mounting is quite soft, and the mass of the stylus is very small so that the forces which the record produces on the stylus are small. The tendency in modern pickup design is to make the stylus mass smaller and smaller and the compliance higher and higher. Present pickups are made to play with a vertical pressure of between 0.5 and 3.0 grams, and stylus compliances of the order of $10^{-6}$ dynes per centimeter. It is probable that the compliances will increase far beyond this and the weight will decrease further as development of modern pickups continues. The body of the pickup, however, and portion of the arm on which it is mounted produce an equivalent mass which resonates against the compliance of the stylus. This resonance, unfortunately, has a very undesirable effect. Because of the very high compliance of the stylus mounting, the resonance produces large low frequency excursions, unless heavily damped, whenever the stylus is excited by a transient, which occurs frequently in playing music or because of the eccentricities of the record. Damping is, of course, utilized both in the mounting of the stylus to the pickup head, and sometimes in the mounting of the whole arm. Viscous damping has been employed in the bearings, and has been employed in dynamic fashion as, for example, in U.S. Patent No. 3,031,196.

In any mounting it would be desirable to keep the mass of the pickup to as low a value as possible, which means that both the pickup itself and its supporting structure should be made as light as possible. The overall resonance of this combined mass against the stylus compliance should be at some frequency below the audio range; somewhere between 10–15 cycles is quite satisfactory. The pickup should behave as a rigid unit for the very low frequency oscillations due to eccentricities of the record, that is, the head and the stylus should move together so that no output results due to the low frequency motions of the head. But for frequencies in the audio range, that is, 20 cycles per second and above, the head should stand still while the stylus oscillates. This is achieved by making the head-stylus resonance in the range mentioned above. By keeping the pickup mass as small as possible, the amount of damping required is kept to a minimum. Small amounts of damping are highly desirable when using high compliance stylii.

When the pickup is mounted in an arm, a large part of the arm mass is reflected as an equivalent mass at the pickup head, that is, the mass that the stylus sees above it is not only the mass of the pickup itself but of a good portion of the arm. By having a counterweight close to the pivot, the mass of the counterweight is reflected only partially at the stylus, but the portion of the arm which is close to the pickup head is almost totally added to the mass of the pickup and forms an undesirable component of the total mass which produces large low frequency oscillations and requires considerable damping to control.

If one could devise a mounting for a pickup which requires no arm and which adds as little weight as possible to the moving system and, moreover, one which produces a straight-line motion of the pickup to maintain tangency, one would have a most desirable mounting. Moreover, the mounting has to satisfy some other mechanical requirements. It should be free to move left and right, both to follow the low frequency oscillations of eccentric grooves, and to follow the normal spiralling of the groove toward the inside of the record. Moreover, it must be free in the up-and-down direction because records sometimes are not flat, both because of normal warpage, and because turntables are not necessarily completely free of up-and-down eccentricities. The motions mentioned here are obviously of low frequency, and the pickup mounting should be so designed as to follow these motions with as little resistance as possible.

Prior attempts to mount pickups so that they move in a straight line along a track have suffered in that they were not free enough for present pickups. The wheels and the bearings shown in the patents mentioned above, which were typical, would be entirely unsuitable for modern one-gram pickups. The other difficulty with the devices of the prior art is that the pickups did not have enough vertical compliance so they could not move up and down as easily as they could move left and right. This is absolutely necessary with modern stereo pickups which have vertical compliances of the same low values as their lateral compliances. Another mechanical requirement which must be met by the mounting is that when the pickup does move up and down due to the wobble of the record, the stylus should not move forward and back along the groove as the result of this motion. If the stylus does have an appreciable forward and back or longitudinal motion, it will produce "wow."

To summarize the above, what is needed is a pickup mounting which requires no arm or as little arm mechanism as possible; which permits the stylus to move laterally and up and down with almost complete freedom; and one so arranged that when the stylus does move up and down, there is a negligible longitudinal motion, so as to minimize "wow." I have met the above requirements in the invention of this specification, which shows two basic embodiments of the invention. One uses an air bearing which has its horizontal axis at the surface of the record and the second, where the horizontal axis is very close to the surface of the record. In both cases, the lateral motion is sufficiently free to play records with the best and lightest of modern pickups.

The specific nature of my invention, as well as other objects and advantages thereof, will clearly appear from a description of a preferred embodiment as shown in the accompanying drawings, in which.

Figure 1:
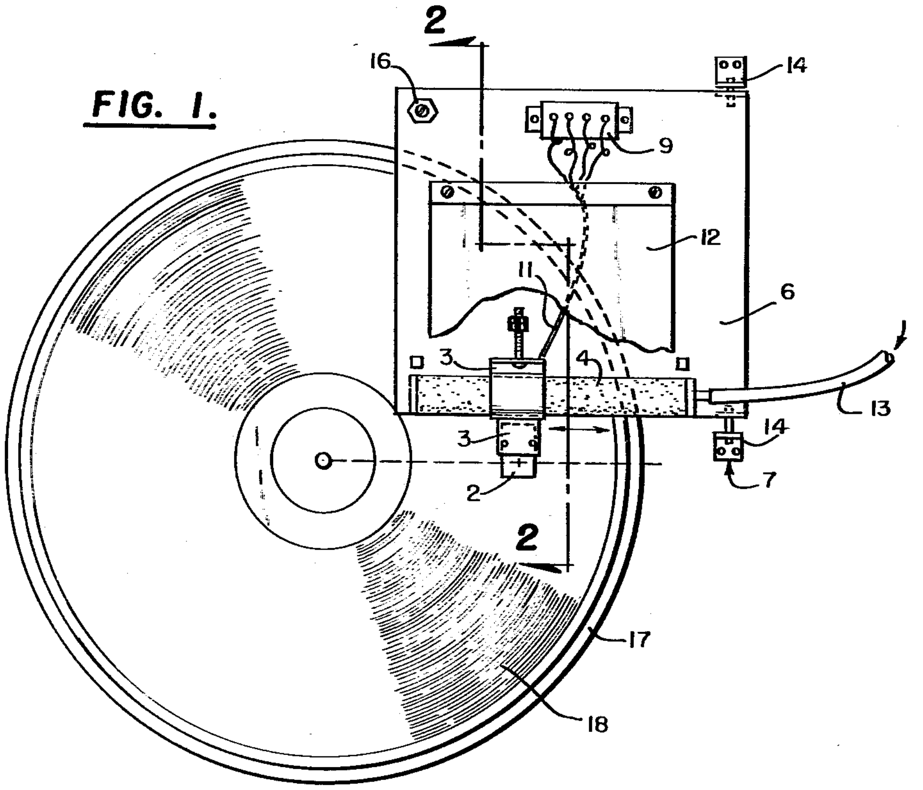
FIG. 1 shows a top view of a pickup supported by an air bearing which provides a rotary motion about the horizontal axis at the surface of the record and a sliding air bearing for the lateral motion.
Figure 2:
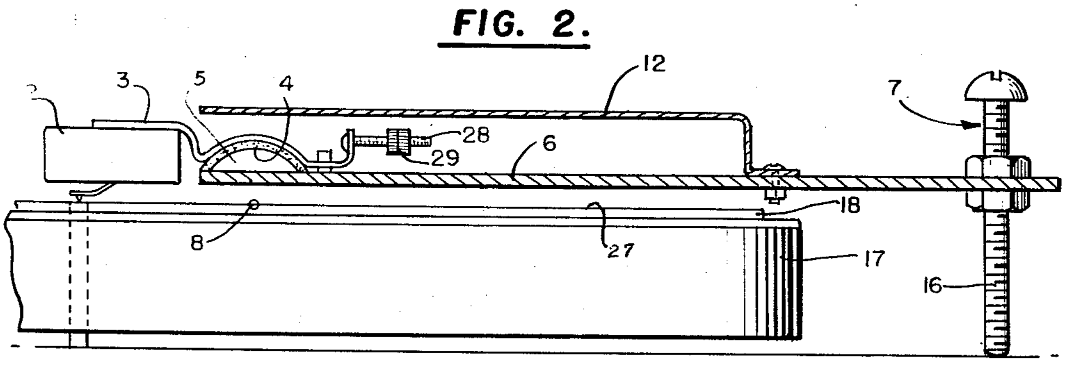
FIG.2 shows a side view of the same invention.

Referring to FIGS. 1 and 2, the conventional pickup head is shown at 2. Attached immediately to it or made integral with the head is a curved sheet member 3. This member 3 rests on the curved porous member 4 which provides the air bearing. The curved member 4 is attached by welding or cementing to a flat member 6 which is supported immediately above the surface of the record but not in contact with it. A suitable hinged structure 7 is used to support this above the record and arranged to be swung out of the way when the record is to be changed. Air under pressure is supplied to the chamber 5 under the curved member 4. A suitable remote pump of any conventional design can be used for this purpose. The curved member 4 can be made of a porous material such as sintered bronze commonly used for bearings. The air escaping through the pores of this material forms a cushion for the curved member 3 attached to the phonograph arm. By making the center of curvature of the member 4 to lie at the surface of the record as shown by point 8, the pickup has an effective center of rotation about this point. Thus, as the stylus is raised and lowered by an eccentric record, it will describe a very close approximation to vertical motion and will produce no "wow" due to this effect. The signal wires for the design of this invention will obviously have to be made light and thin, and I show them suspended from a terminal block 9, and joined into a light cable 11. In practice, I have used unshielded Litz wire, which is fine stranded wire of very great flexibility, and obtained the effect of shielding by covering the whole assembly with a sheet of metal 12, so that the wires were shielded from outside noise. The elimination of the normal shield and heavy insulation enables me to use very flexible wires which do not impede the motion of the pickup.

The air is supplied to curved member 4 from an external pump (not shown) by flexible tubing 13. The base member 6, which carries the entire assembly, is supported in any suitable manner, as by hinges 14 and adjustable stop 16, whereby the base 6 is adjusted with respect to turntable 17 and record 18.

The use of an external pump may be a drawback for household phonographs. It would, however, be tolerable in commercial applications. Furthermore, the design of the pickup mounting is so simple and so rugged that for this application the use of the pump is, in my opinion, warranted and the advantages of such a simple mechanism outweigh the disadvantages of using a small air pump which may be driven by a suitably designed phonograph motor.

Figure 3:
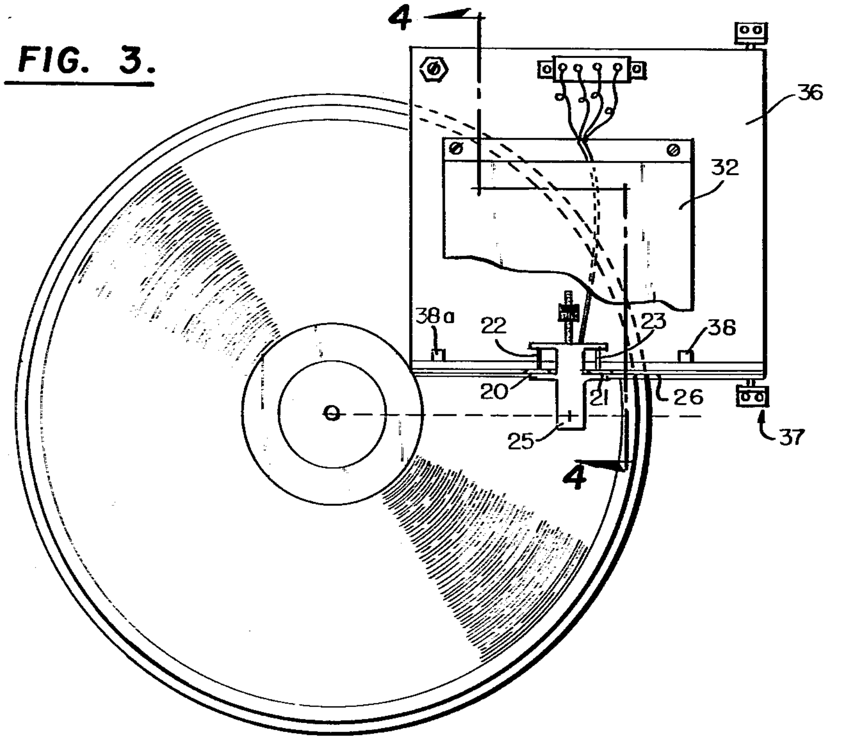
FIG. 3 shows a top view of a modified form of the invention.
Figure 4:
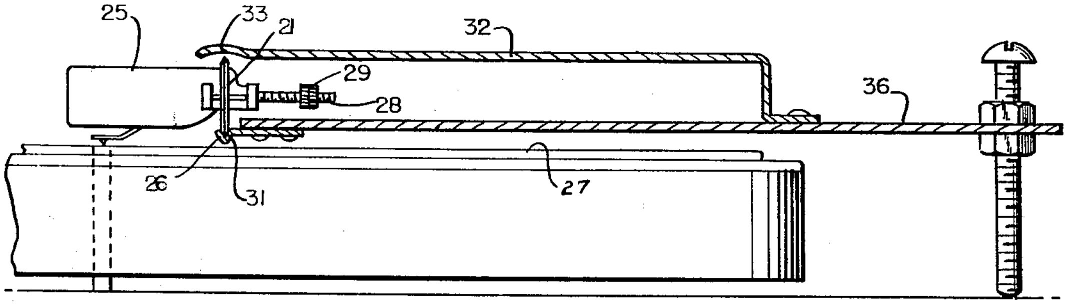
FIG. 4 is a sectional view taken on line 4—4 of FIG. 3.
Figure 5:
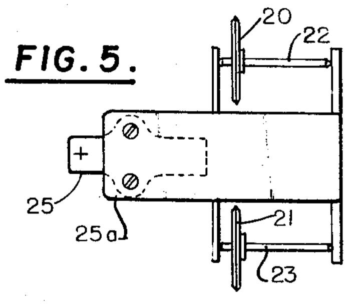
FIG. 5 is a top view of the pickup head of the unit shown in FIG. 6.

Another embodiment of my invention is shown in FIGS. 3 and 4 where I use a purely mechanical mounting that does not require an air bearing and which has most of the advantages of the first embodiment. In this case, the ordinary pickup head 25 has attached to, or made integral with it a very light framework that carries two thin wheels 20, 21 which are integrally mounted on two thin shafts 22, 23 which are in pivot bearings as shown in FIG. 5. The wheels are made of thin metal or plastic with a rather sharp edge as shown in FIG. 5. The two wheels ride in a grooved track 26 which is supported just above the record surface 27. For good turntables and reasonably good records, this spacing need not be more than about 1/16 of an inch. For cheaper quality turntables and warped records, an eighth of an inch would perhaps be more desirable. It will be recognized that now I have produced a support for the pickup which permits it to move very freely in the lateral direction because the two supporting wheels have large diameters so that, for normal pickup motions, they move very, very slowly, and because their pivot bearings are of very small radius. I can use such fine pivots because each supports only one or two grams of the total weight.

Figure 6:
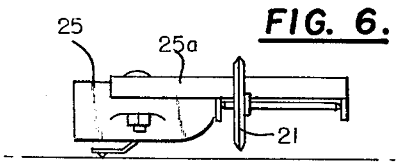
FIG. 6 is a side view of a head similar to that shown in FIG. 4.

The pickup can be counterbalanced by an arrangement such as a screw 28 and two nuts 29 as best shown in FIG. 4; however, if the pickup head is designed initially for the present type of construction, the wheels can be so located that without any additional counterweight the force on the stylus is of the desired figure, as shown in FIGS. 5 and 6. This has the advantage not only of producing a very low total force on the low mass stylus, but it has the advantage that once it is built in the factory no adjustments are later required to maintain the desired force at the stylus, since there is no additional member attached to the pickup. It will be noticed that the edges of the wheels form a vertical bearing for the up-and-down oscillations of the stylus. In other words, when the stylus is lifted by warpage of the record, the whole pickup head rocks about the point 31 at the bottom of the groove 26. Because this groove is close to the surface of the record, the stylus moves essentially in an up-and-down direction and the forward-and-aft motion is small enough to be negligible in practical designs. It should be pointed out that the fore-and-aft motion depends on the cosine of the angle between the surface of the record and a line joining the pickup stylus with the center of rotation in the up-and-down direction as shown in FIG. 4. For small angles the cosine is sufficiently close to unity so the longitudinal motion of the stylus can be neglected. If the turntable is well built and if the records lie fairly flat on this turntable, this up-and-down motion is small and therefore the longitudinal effects are entirely negligible. A spirit level can be attached to the track 26 and a screw adjustment 16 provided for the mounting so that the track can be set to be level independently of small errors in the leveling of the turntable. Such a spirit level can, of course, be used for setting the turntable when it is installed so that it, too, is horizontal.

In FIG. 4, the cover 32 over the track serves two purposes. It shields the flexible wires again which must be used for this arrangement, and it is curved at 33 to provide a capturing mechanism for the pickup mount wheels so that the pickup does not fall off the track when it is handled. Curve 33 is slightly spaced from the top edge of disc 20 so as to permit normal up-and-down motion of the pickup to follow the record, but is shaped so as to maintain a constant small clearance with the top edge of the disc and so hold the wheels in a captured condition at all times. The counterweight and its arm engage either base 36 or cover 32 if the pickup is flexed more than a small amount, thus helping to retain the pickup unit in place. When the support 36 is lifted along hinge line 37, the pickup is lifted with it and automatically returns to the initial outside position relative to the record. To prevent it from being damaged as it rolls back during such a lifting operation, a rubber of sponge cushion or small dashpot at 38 can be used to provide a gentle stop, and a similar stop may be provided at **38*a***. It will be noted that in the prior art where rolling or sliding mechanisms have been suggested for supporting the pickup head, vertical freedom was not considered important, and even in cases where ball bearings were used for the lateral motion, no provision was made for low friction in the up-and-down direction. In no case was the pivot put low enough to reduce "wow" sufficiently to be practical for modern high quality records.

FIGS. 5 and 6 show a type of head which does not require a counterweight. The cartridge 25 is fastened to unit **25*a* which supports the wheels 20, 21, and the whole assembly is so balanced that the plane of the wheels is sufficiently far behind the center of gravity of the unit to provide the required stylus pressure, while keeping the mass very low, without requiring further adjustment. While FIGS. 5 and 6 show the discs and their mounting as a separate unit to be fitted with a standard pickup cartridge 25**, the entire unit can be factory-made with the discs pre-assembled together with the cartridge; in this case the entire unit can be balanced and the counterweight omitted, if desired.

It will be apparent that the embodiments shown are only exemplary and that various modifications can be made in construction and arrangement within the scope of my invention as defined in the appended claims.

I claim:

1. In a phonograph for playing grooved disc records on a turntable, a pickup assembly comprising (a) a stylus for following the disc grooves, (b) a head mounting said stylus, (c) guide means supported by the phonograph, (d) said guide means including low-friction bearing means between said head and said guide means permitting limited pivotal vertical motion of the head about an axis substantially at the surface of a record disc mounted on said turntable, (e) said guide means including also bearing means for guiding said head with very low friction in a horizontal path such that the stylus moves along a radial path on the record, (f) said bearing means comprising horizontal linear track means mounted on said phonograph in a plane which is very close to the plane of the phonograph disc record, (g) two wheels fixed to said head, one wheel on each side of the head, said wheels riding on said track means for guiding the stylus laterally along said radial path, (h) said wheels being thin discs with sharp edges, said track means comprising a grooved element for receiving said sharp edges with substantially line contact between the sharp edges and the bottom of the groove, (i) said wheels and the attached head being free to move pivotally as a whole for a limited distance about the line of contact between the wheels and the track, to permit at least a small amount of vertical movement of the stylus with respect to the surface of a record.

2. The invention according to claim 1, and constraining means for maintaining the wheels on the track when the head is lifted away from the record disc, said constraining means permitting said limited movement of the stylus in the vertical direction when the stylus is on the playing surface of a record.

References Cited

UNITED STATES PATENTS

| | | | |
|---|---|---|---|
| 2,219,230 | 10/1940 | Kraise | 274—23.1 X |
| 2,676,808 | 4/1954 | Masterson | 274—23.1 X |
| 2,948,538 | 8/1960 | Tomaselli | 274—23.1 |

FOREIGN PATENTS

| | | |
|---|---|---|
| 231,292 | 6/1959 | Australia. |
| 917,752 | 2/1963 | Great Britain. |

HARRY N. HAROIAN, *Primary Examiner.*

LEONARD FORMAN, *Examiner.*